United States Patent [19]

Kurokawa

[11] Patent Number: 5,079,853
[45] Date of Patent: Jan. 14, 1992

[54] PHOTOSENSITIVE MATERIAL DRYING APPARATUS

[75] Inventor: Toshio Kurokawa, Kanagawa, Japan

[73] Assignee: Fuji Photo Film Co., Ltd., Kanagawa, Japan

[21] Appl. No.: 599,573

[22] Filed: Oct. 18, 1990

[30] Foreign Application Priority Data

Oct. 19, 1989 [JP] Japan ............... 1-270188

[51] Int. Cl.⁵ .................. F26B 13/26; F26B 21/00; F26B 13/18; F26B 13/30
[52] U.S. Cl. ............................ 34/60; 34/95; 34/114; 34/155
[58] Field of Search .............. 34/9, 60, 95, 95.3, 34/113, 114, 155, 160

[56] References Cited

U.S. PATENT DOCUMENTS

| | | | |
|---|---|---|---|
| 3,296,710 | 1/1967 | Krikorian | 34/95 |
| 3,525,160 | 8/1970 | Dokoupil et al. | 34/9 X |
| 3,659,347 | 5/1972 | Wallsten | 34/9 |
| 3,854,220 | 12/1974 | Yamaguchi | 34/9 |
| 3,934,354 | 1/1976 | Hope et al. | 34/95 X |
| 3,968,571 | 7/1976 | Oschatz et al. | 34/95 X |
| 4,079,524 | 3/1978 | Amicel et al. | 34/9 X |
| 4,117,604 | 10/1978 | Burg et al. | 34/95 X |
| 4,142,301 | 3/1979 | Goodall | 34/60 X |

FOREIGN PATENT DOCUMENTS

| | | | |
|---|---|---|---|
| 0093474 | 8/1978 | Japan | 34/95.3 |
| 0181043 | 10/1983 | Japan | 34/95 |
| 2046420 | 11/1980 | United Kingdom | 34/95.3 |

*Primary Examiner*—Henry A. Bennett
*Assistant Examiner*—Christopher B. Kilner
*Attorney, Agent, or Firm*—Sughrue, Mion, Zinn, Macpeak & Seas

[57] ABSTRACT

A photosensitive material-drying apparatus for drying a photosensitive material after being dipped in a treatment solution to wet the same. Water-absorbing rollers for contact with the same surface of the photosensitive material are provided in the vicinity of a photosensitive material-introducing inlet, and are arranged along a direction of transfer of the photosensitive material. The water-absorbing abilities of the water-absorbing rollers is increased progressively in the direction of transfer of photosensitive material.

22 Claims, 3 Drawing Sheets

PHOTOSENSITIVE MATERIAL DRYING APPARATUS

BACKGROUND OF THE INVENTION

The present invention relates to an apparatus for drying a photosensitive material, after the exposed photosensitive material is dipped in treatment solutions and subjected to treatments, for example, development.

There is known a photosensitive material treatment apparatus of the type in which an exposed photosensitive material is subjected to treatments such as development, bleaching, fixing, bleach fixing, stabilization, rinsing, etc., so as to form an image on the photosensitive material. In the above treatments, for example, the exposed photosensitive material, while being transferred, is dipped in treatment solutions, which causes the photosensitive material having the image formed thereon to swell. Also, the treatment solution adheres to the surface of the photosensitive material. Therefore, it is necessary to delay transferring the photosensitive material until after the treatment solution deposited on or contained in the photosensitive material is evaporated so as to to dry the photosensitive material. For this reason, generally, the photosensitive material treatment apparatus has a photosensitive material drying section provided integrally with the apparatus.

Photosensitive material treatment apparatuses having a drying treatment are disclosed in Japanese Laid-Open Utility Model Applications Nos. 138939/83 and 62840/88 and Japanese Laid-Open Patent Applications Nos. 118839/89, 118840/89, 123233/89 and 123236/89. The drying sections of these apparatuses are designed to apply a blast of hot air to the photosensitive material after it passes through the treatment solutions, or designed to apply infrared rays to the photosensitive material to evaporate the water content on the surface or in the interior of the photosensitive material.

In the above conventional drying methods, the atmosphere around the photosensitive material is heated or dried by a blast of hot air or infrared rays, so that the photosensitive material is dried by the heated or dried atmosphere. Therefore, the drying efficiency is low, thus presenting a problem that a long time is required for drying the photosensitive material.

Further, as a result of evaporation of water droplets deposited on the surface of the photosensitive material, evaporation traces may remain on the surface of the photosensitive material, thus presenting a problem that the quality of the image formed on the photosensitive material is degraded.

SUMMARY OF THE INVENTION

An object of this invention is to overcome the above problems, and more particularly to provide a photosensitive material drying apparatus which can efficiently evaporate water content from photosensitive material subjected to various treatments, thereby drying the photosensitive material in a short time, and enabling a good image to be formed on the photosensitive material.

The above object of the invention has been achieved by a photosensitive material drying apparatus wherein a photosensitive material, after being dipped in a treatment solution, is dried, wherein, in accordance with the invention, a plurality of water-absorbing rollers for contact with the same surface of the photosensitive material are provided in the vicinity of a photosensitive material-introducing inlet and are arranged along a direction of transfer of said photosensitive material, the water-absorbing abilities of the water-absorbing rollers increasing progressively in the direction of transfer of the photosensitive material. Because the plurality of water-absorbing rollers in contact with the photosensitive material positively absorb the water content deposited on the photosensitive material, the photosensitive material can be dried in a short time at a later transfer step in the drying apparatus.

A large water content tends to be deposited on or contained in the photosensitive material disposed near the introducing inlet. Therefore, the first water-absorbing roller brought first into contact with the photosensitive material can easily absorb the water content even if this roller has a low water-absorbing ability. The water content remaining on the photosensitive material after the contact thereof with the first water-absorbing roller is much smaller than before the contact with the first water-absorbing roller; however, it is difficult to absorb all the water content on the photosensitive material using only the first water-absorbing roller. In order to absorb the small water content remaining on the photosensitive material after the contact of the photosensitive material with the first water-absorbing roller, the second water-absorbing roller to be subsequently brought into contact with the photosensitive material is required to have a higher water-absorbing ability.

In the present invention, the water-absorbing ability of the second water-absorbing roller is determined to be higher than that of the first water-absorbing roller. Therefore, even the small amount of water content remaining on the photosensitive material can be absorbed. Further, even if a small amount of water content remains on the photosensitive material after the contact of the second water-absorbing roller with the photosensitive material, the third water-absorbing roller higher in water-absorbing ability than the second water-absorbing roller is brought into contact with the photosensitive material to absorb the water content thereon.

Therefore, by suitably determining the number of the water-absorbing rollers and by increasing the water-absorbing abilities progressively in the direction of transfer of the sensitive material, the water content deposited on the photosensitive material can be positively removed.

Further, since the photosensitive material from which the water content has been positively removed is rapidly dried at a later transfer step, the time required for the drying step in the drying apparatus can be greatly reduced.

Still further, since the water content deposited on the photosensitive material is absorbed by the water-absorbing rollers, no trace of evaporation of the water content will be present on the surface of the photosensitive material, and therefore a good image can be formed on the photosensitive material.

The photosensitive material in the present invention is not limited with respect to the treatment method in so far as the photosensitive material is dried after it is dipped in the treatment solutions. The kinds of photosensitive material used in the present invention may be any of a negative photosensitive material, a positive photosensitive material and a direct positive photosensitive material, and examples of such material are silver halide photographic film, silver halide photographic printing paper, X-ray film, and the like.

DESCRIPTION OF THE PREFERRED EMBODIMENTS

Preferred embodiments of the present invention will now be described with reference to the accompanying drawings. However, the present invention is not restricted to these embodiments.

Although the present invention is directed to a photosensitive material drying apparatus, for better understanding, firstly, a photosensitive material treatment apparatus to which the invention is applied will be described, and secondly, a preferred embodiment of the invention will be described.

Figure 2:
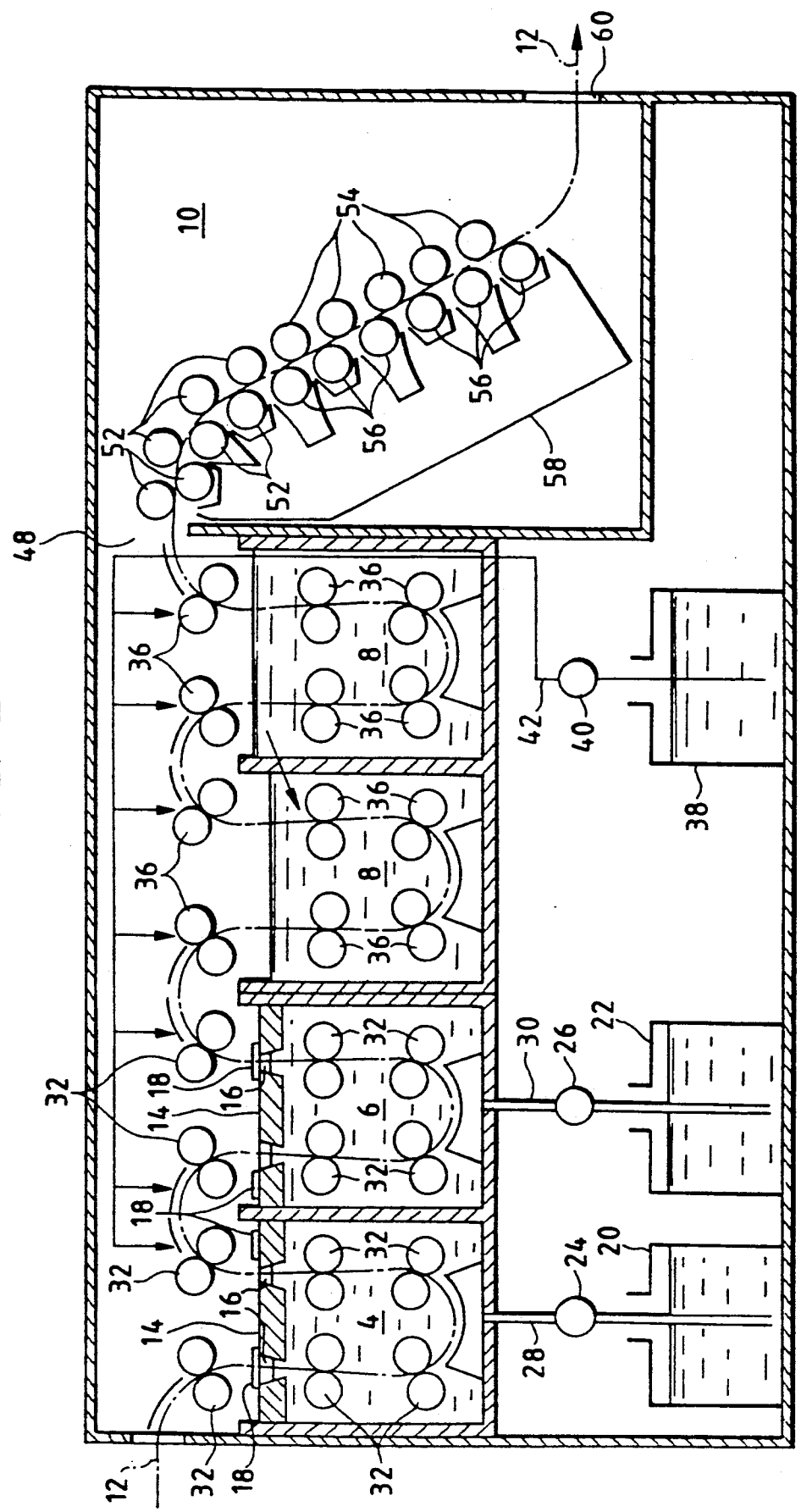
FIG. 2 is a schematic structural view of a photosensitive material treatment apparatus incorporating the photosensitive material drying section.

FIG. 2 depicts an apparatus for treating a silver halide photographic-type color paper to which the present invention is applied. In this treatment apparatus, a sheet of color paper, exposed based on a positive original, is subjected to development, bleach-fixing and rinsing, and then is dried to form an image on the color paper.

A developer vessel 4, a bleach-fixing vessel 6, a rinsing vessel 8 and a drying section 10 are continuously provided in a treatment apparatus body 2. The color paper (hereinafter referred to as "photosensitive material") 12 subjected to exposure is subjected to development, bleach-fixing and rinsing, and then is dried in the drying section 10, and then is discharged from the body 2.

The developer vessel 4 and the bleach-fixing vessel 6 have respective floating lids 14 so as to reduce the areas of contact of a developing solution and a bleach fixing solution (held respectively in these vessels) with the ambient atmosphere to a minimum. Passages 16 for passing the photosensitive material 12 are formed through the floating lid 14, and the passage 16 is suitably opened and closed by a liquid level shutter 18. In the condition shown in FIG. 2, the inlet passage of the developer vessel 4 and the outlet passage of the bleach-fixing vessel 6 are closed by the respective shutters 18, and also the outlet passage of the developer vessel 4 and the inlet passage of the bleach-fixing vessel 6 are opened. Tanks 20 and 22 for supplying a developer replenisher and a bleach-fixing replenisher, respectively, to the developer vessel 4 and the bleach-fixing vessel 6 are provided beneath the developer vessel 4 and the bleach-fixing vessel 6, respectively. The replenishers in the tanks 20 and 22 are suitably supplied to the developer vessel 4 and the bleach-fixing vessel 6 via pumps 24 and 26 and pipes 28 and 30, respectively.

In each of the developer vessel 4 and the bleach-fixing vessel 6, pairs of transfer rollers 32 are provided for holding and transferring the photosensitive material 12 therebetween to dip the material 12 in the developing solution and the bleach-fixing solution.

The rinsing vessel 8 is constructed from two-stage vessels, and overflow water from the second-stage vessel is supplied to the first-stage vessel.

In the rinsing vessel 8, pairs of transfer rollers 36 are provided for holding and transferring the photosensitive material 12 therebetween to dip the material 12 in the rinsing water.

A tank 38 for replenishing the second-stage vessel with rinsing water is provided under the rinsing vessel 8. The replenisher in the tank 38 is supplied to the second-stage vessel via a pump 40 and a pipe 42, also is supplied to the transfer rollers 32 and 36 to wash the peripheral surfaces of the rollers 32 and 36.

Water-absorbing rollers 52 for contact with an emulsion surface and a support of the photosensitive material 12 are provided in the vicinity of a photosensitive material introducing inlet 48 of the drying section 10, and are arranged in a staggered manner. Transfer rollers 54 and 56 for transferring the photosensitive material 12 are provided downstream of the water-absorbing rollers 52. Further, the drying section 10 is provided with a duct 58 for supplying air to the emulsion surface of the photosensitive material 12 through the spaces between the adjacent rollers.

Next, the photosensitive material drying section 10 embodying the present invention will now be described with reference to FIG. 1.

Figure 1:
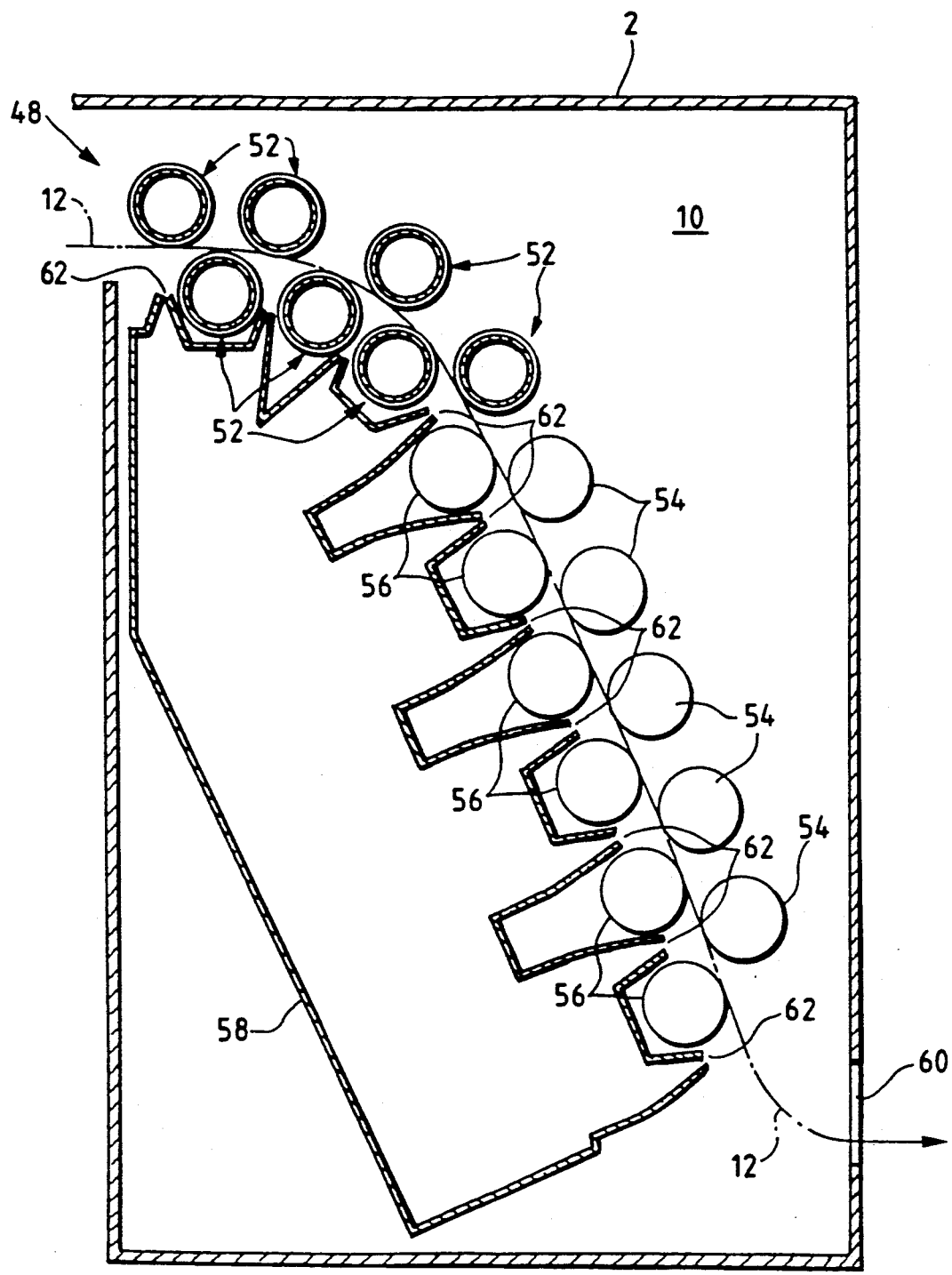
FIG. 1 is a structural view of a photosensitive material drying section embodying the present invention.

FIG. 1 is a structural view of the drying section 10.

The water-absorbing rollers 52 for contact with the support (the upper portion in the drawing) and the emulsion surface (the lower portion in the drawing) of the photosensitive material 12 are provided in the vicinity of the photosensitive material-introducing inlet 48 of the drying section 10, and are arranged in a staggered manner with respect to a path of transfer of the photosensitive material. The water-absorbing abilities of these water-absorbing rollers 52 increase gradually in the direction of transfer of the photosensitive material. In this embodiment, four water-absorbing rollers 52 are provided on the side of the support, and three water-absorbing rollers 52 are provided on the side of the emulsion surface; however, the number of the water-absorbing rollers 52 is not limited, and can be suitably changed. The water-absorbing rollers 52 need not necessarily be arranged in a staggered manner, and may be arranged in abutting relation.

The transfer rollers 54 are provided following the water-absorbing rollers 52, and are arranged in a staggered manner. The transfer rollers 54 disposed on the side of the support of the photosensitive material 12 are made of rigid rubber, and the transfer rollers 56 disposed on the side of the emulsion surface are made of a phenolic resin. The photosensitive material 12, transferred and dried at the drying section 10, is discharged to the exterior of the body 2 through an outlet 60.

The duct 58 is provided on the side of the emulsion surface of the photosensitive material 12, and an air discharge opening 62 is disposed between corresponding adjacent rollers, in opposed relation to the emulsion surface of the photosensitive material 12. The air discharge openings 62 extend over the width of the photosensitive material 12. Dry air (preferably dry air of high temperature) is always fed into the duct 58 by a fan (not shown), and the dry air thus fed is blown toward the photosensitive material 12 through the air discharge openings 62. The air blown from the air discharge openings 62 is discharged to the exterior of the body 2 through a suction port (not shown).

Sprockets are mounted on respective ends of the shafts of the water-absorbing rollers 52 and transfer rollers 54 and 56. An endless chain, driven along the path of transfer of the photosensitive material, drives and rotates the water-absorbing rollers 52 and the transfer rollers 54 and 56 through the sprockets, thereby transferring the photosensitive material 12 at a speed of 30 to 200 cm/min. In this embodiment, the speed of transfer is 90 cm/min.

When the photosensitive material 12 is fed from the rinsing vessel 8 into the drying section 10, the water-absorbing rollers 52 are sequentially brought into contact with the photosensitive material 12 so that film-like or droplet-like rinsing water deposited on the photosensitive material 12 is absorbed by water-absorbing materials 72. Although when the photosensitive material 12 is sequentially brought into contact with the water-absorbing rollers 52, the water content deposited on the photosensitive material 12 is completely removed, the number of the water-absorbing rollers 52 can be changed depending on the efficiency of removal of the water content.

The photosensitive material 12 passed past the water-absorbing rollers 52 is transferred by the transfer rollers 54 and 56, and during this transfer, dry air is blown from the air discharge openings 62 of the duct 58 to the photosensitive material, and the photosensitive material is completely dried before it is discharged to the exterior of the body 2.

Figure 3:
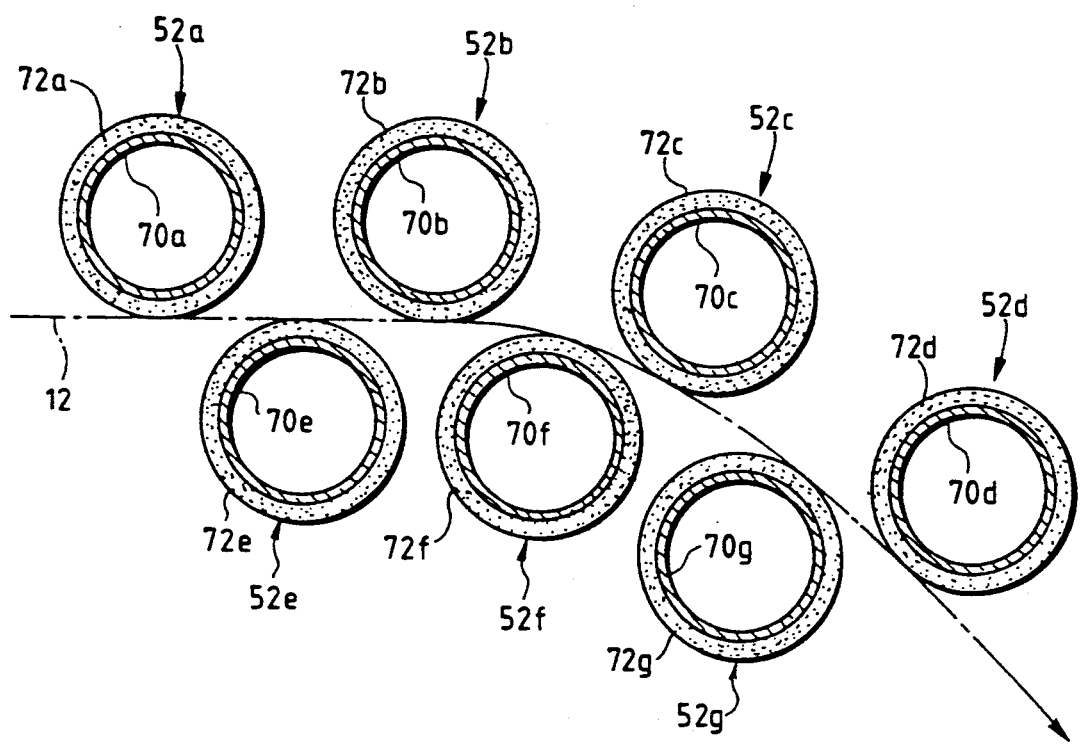
FIG. 3 is an enlarged, cross-sectional view of water-absorbing rollers.

FIG. 3 is an enlarged cross-sectional view of the water-absorbing rollers 52.

Each of the water-absorbing rollers 52a to 52g is composed of a metal roller 70a–70g of a hollow cylindrical shape made, for example, of aluminum, and water-absorbing material 72a–72g mounted on the peripheral surface of the metal roller 70a–70g. The axial length of the metal roller 70a–70g as well as the axial length of the water-absorbing material 72a–72g is longer than the width of the photosensitive material 12. For the water-absorbing material 72a–72g, there can be used natural or artificial materials, such as silk, wool, cotton, sponge, pulp, polypropylene-type fiber, polyester-type fiber, e.g., Tetron (registered trademark of Toray Company and Teijin Company), nylon, and aromatic polyamide fiber, e.g., Kevler and Nomex (both of which are registered trademarks of Du Pont Company). These materials may be provided in a cotton-like form, a cloth-like form, a gauze-like form, a paper sheet-like form or a sponge-like form. Also, there can be used plastics, such as polypropylene, polyethylene, polystyrene, polybutadiene, polyvinyl chloride, polyacetal and phenol, and ceramics, such as alumina. These materials may be foamed or sintered. Further, there can be used highly absorbent materials, such as polyacrylonitrile, polyvinyl alcohol, sodium polyacrylate and carboxymethylcellulose, which are molded into a porous form or a sponge-like form. The metal rollers 70a to 70g can be replaced by rollers of a rigid plastics resin.

The group of water-absorbing rollers 52a to 52d disposed on one side of the photosensitive material 12, as well as the group of water-absorbing rollers 52e to 52f disposed on the other side, are increased gradually in water-absorbing ability in the direction of transfer of the photosensitive material indicated by an arrow. The adjustment of the water-absorbing ability is made, for example, by selecting the materials for the water-absorbing materials 72a to 72g. Namely, the water-absorbing materials sequentially arranged in the direction of transfer of the photosensitive material are made of materials whose water-absorbing ability increase progressively in this transfer direction, and by doing so, the water-absorbing ability of the water-absorbing rollers 52a to 52g can be adjusted.

For example, where the above-mentioned materials are used to form the water-absorbing materials 72a to 72g, the water-absorbing materials 72a to 72d of the first to fourth water-absorbing rollers 52a to 52d are made of a nylon cloth, foamed polyvinyl chloride, foamed polyacrylonitrile and foamed polyvinyl alcohol, respectively, and also the water-absorbing materials 72a to 72g of the fifth to seventh water-absorbing rollers 52a to 52g are made of foamed polyvinyl chloride, foamed polyacrylonitrile and foamed polyvinyl alcohol, respectively.

The water-absorbing abilities of the water-absorbing rollers 52a to 52g can be adjusted by another construction.

Figure 4:
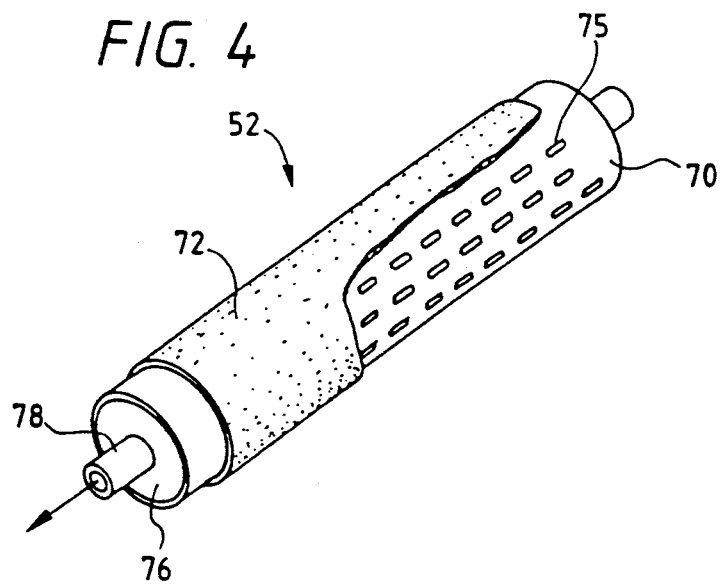
FIG. 4 is a partly-broken perspective view of a modified water-absorbing roller.

FIG. 4 is a partly-broken perspective view of a modified water-absorbing roller 52. The water-absorbing material 72 of this water-absorbing roller 52 is made of a woven fabric having water-absorbing properties and air-permeability. Openings 75 are formed in the peripheral surface of the metal roller 70 disposed in contact with the water-absorbing material 72, and are distributed over this peripheral surface. The opposite ends of the metal roller 70 are sealingly closed by respective seal members 76, and a shaft 78 is fixedly secured to the seal members 76. The shaft 78 is hollow, and the interior of the shaft 78 is in communication with the interior of the metal roller 70. A suction source is connected to the shaft 78, and further the shaft 78 is connected to a duct communicating with the exterior of the body 2. By drawing air through the metal roller 70, the air around the water-absorbing roller 52 and the water content deposited on the photosensitive material 12 are drawing through the water-absorbing material 72 and the openings 75.

The water-absorbing ability of the water-absorbing roller 52 can be adjusted by increasing or decreasing the ability of the degree of suction or by increasing and decreasing the degree of opening (the ratio of the total area of the openings 75 to the area of the peripheral surface of the metal roller 70). Thus, by increasing the suction ability (relative to the water-absorbing roller 52) or the degree of opening progressively in the direction of transfer of the photosensitive material, the water-absorbing ability can be increased progressively. The water content of the water-absorbing material 72 is evaporated quickly, so that the water-absorbing ability of the water-absorbing material 72 will not be lowered.

Further, the adjustment of the degree of suction, the adjustment of the opening degree, and the selection of the materials for the water-absorbing materials can be suitably combined so as to adjust the water-absorbing abilities.

A device for heating the water-absorbing roller 52 can be provided so as to evaporate and remove the water content contained in the water-absorbing material 72, and therefore the lowering of the water-absorbing ability of the water-absorbing roller 52 can be prevented. Examples of suitable heating devices include a device for blowing air of high temperature to the water-absorbing roller 52, and a heater provided adjacent to or inside the water-absorbing roller 52.

In the present invention, the plurality of water-absorbing rollers, disposed in contact with the same surface of the photosensitive material, positively absorb the water content deposited on the photosensitive material, and therefore the photosensitive material is dried in a short time at a later transfer step within the drying apparatus.

Further, the second water-absorbing roller, which is brought into contact with the photosensitive material after the first water-absorbing roller is contacted with the photosensitive material, is higher in water-absorbing ability than the first water-absorbing roller, and therefore the second water-absorbing roller absorbs a small amount of water content remaining in the photosensitive material after the contact of the first water-absorbing roller with the photosensitive material. Even if there still remains some water content after the contact of the second water-absorbing roller with the photosensitive material, the third water-absorbing roller higher in water-absorbing ability than the second water-absorbing roller absorbs the water content on the photosensitive material after the contact of the second water-absorbing roller with the photosensitive material.

Therefore, by suitably determining the number of water-absorbing rollers and by increasing the water-absorbing abilities progressively in the direction of transfer of the photosensitive material, the water content deposited on the photosensitive material can be positively removed.

Because the photosensitive material from which the water content has been positively removed is rapidly dried at a later transfer step, the time required for the drying step in the drying apparatus can be greatly reduced.

Further, since the water content deposited on the photosensitive material is absorbed by the water-absorbing rollers, no trace of evaporation of the water content will be present on the surface of the photosensitive material, and therefore a good image can be formed on the photosensitive material.

What is claimed is:

1. In a photosensitive material-drying apparatus for drying a photosensitive material after being dipped in a treatment solution, the improvement wherein a plurality of water-absorbing rollers for contact with the same surface of said photosensitive material are provided in the vicinity of a photosensitive material-introducing inlet, said water-absorbing rollers being arranged along a direction of transfer of said photosensitive material, wherein, prior to any of said rollers having absorbed any water, the water-absorbing abilities of said water-absorbing rollers increases progressively in the direction of transfer of said photosensitive material.

2. The photosensitive material drying apparatus of claim 1, wherein said water-absorbing rollers are arranged in a staggered manner with respect to a path of transfer of the photosensitive material.

3. The photosensitive material drying apparatus of claim 1, wherein a plurality of said water-absorbing rollers are provided on each side of said photosensitive material.

4. The photosensitive material drying apparatus of claim 1, further comprising a duct for supplying air to an emulsion surface of said photosensitive material through spaces between adjacent ones of said rollers.

5. The photosensitive material drying apparatus of claim 1, wherein each of said water-absorbing rollers comprises a metal roller of a hollow cylindrical shape.

6. The photosensitive material drying apparatus of claim 5, wherein said metal roller is made of aluminum.

7. The photosensitive material drying apparatus of claim 5, wherein each of said water-absorbing rollers further comprises an outer layer of water-absorbing material mounted on a peripheral surface of said metal roller.

8. The photosensitive material drying apparatus of claim 5, wherein an axial length of said metal roller and an axial length of said water-absorbing material are longer than the width of the photosensitive material.

9. The photosensitive material drying apparatus of claim 7, wherein said water-absorbing material is a material selected from the group consisting of silk, wool, cotton, sponge, pulp, polypropylene fiber, polyester fiber, nylon, and aromatic polyamide fiber.

10. The photosensitive material drying apparatus of claim 9, wherein said water-absorbing material is provided in a form selected from the group consisting of a cloth, a gauze, a paper sheet form or a sponge.

11. The photosensitive material drying apparatus of claim 9, wherein said water-absorbing material is a plastic material selected from the group consisting of polypropylene, polyethylene, polystyrene, polybutadiene, polyvinyl chloride, polyacetal and phenol.

12. The photosensitive material drying apparatus of claim 9, wherein said water-absorbing material is a ceramic.

13. The photosensitive material drying apparatus of claim 1, wherein said water-absorbing material is alumina.

14. The photosensitive material drying apparatus of claim 1, wherein said water-absorbing material is a foamed material.

15. The photosensitive material drying apparatus of claim 1, wherein said water-absorbing material is a sintered material.

16. The photosensitive material drying apparatus of claim 1, wherein said water-absorbing material is selected from the group consisting of polyacrylonitrile, polyvinyl alcohol, sodium polyacrylate and carboxymethylcellulose.

17. The photosensitive material drying apparatus of claim 16, wherein said water-absorbing material is molded into a porous form.

18. The photosensitive material drying apparatus of claim 16, wherein said water-absorbing material is molded into a sponge.

19. The photosensitive material drying apparatus of claim 1, further comprising means for heating at least one of said water-absorbing rollers.

20. In a photosensitive material-drying apparatus for drying a photosensitive material after being dipped in a treatment solution, the improvement wherein a plurality of air-permeable water-absorbing rollers for contact with the same surface of said photosensitive material are provided in the vicinity of a photosensitive material-introducing inlet, said rollers being arranged along a direction of transfer of said photosensitive material, said rollers comprising a hollow metal member having a plurality of openings formed therethrough, a pair of shafts extending outward from opposite ends of said hollow metal member, at least one of said shafts being hollow and being connected to a suction pressure source, amounts of air drawn through said openings prior to any of said rollers having absorbed any water, increasing progressively in the direction of transfer of said photosensitive material.

21. The photosensitive material drying apparatus of claim 20, wherein the size of said openings increases in said direction of transfer of said photosensitive material.

22. The photosensitive material drying apparatus of claim 20, wherein a degree of suction pressure applied through said shafts increases in said direction of transfer of said photosensitive material.

* * * * *